United States Patent [19]

Ben

[11] Patent Number: 4,468,433

[45] Date of Patent: Aug. 28, 1984

[54] ANTISTATIC COMPOSITION AND POLYESTER FIBER CONTAINING SAME

[75] Inventor: Victor R. Ben, Wilmington, Del.

[73] Assignee: E. I. Du Pont de Nemours and Company, Wilmington, Del.

[21] Appl. No.: 401,626

[22] Filed: Jul. 26, 1982

[51] Int. Cl.³ .............................................. D02G 3/00
[52] U.S. Cl. ..................................... 428/372; 57/248; 428/397
[58] Field of Search ............... 528/372, 373, 374, 364, 528/922, 357, 397; 8/115.5; 260/DIG. 23, DIG. 32, DIG. 16, DIG. 15; 428/274, 287, 294; 57/248

[56] References Cited

U.S. PATENT DOCUMENTS

| | | |
|---|---|---|
| 3,329,557 | 7/1967 | Magat et al. |
| 3,475,898 | 11/1969 | Magat et al. |
| 3,655,821 | 4/1972 | Lofquist |
| 3,833,513 | 9/1974 | Fath |
| 3,900,676 | 8/1975 | Alderson ............................ 428/372 |
| 4,005,057 | 1/1977 | Singh et al. |
| 4,006,123 | 2/1977 | Samuelson et al. |
| 4,035,441 | 7/1977 | Endo et al. |
| 4,038,258 | 7/1977 | Singh et al. ...................... 428/373 X |
| 4,145,473 | 3/1979 | Samuelson et al. ................ 428/373 |
| 4,229,554 | 10/1980 | Newkirk et al. .................... 525/438 |

FOREIGN PATENT DOCUMENTS 1176648 1/1970 United Kingdom.

*Primary Examiner*—Lorraine T. Kendell

[57] ABSTRACT

A polymeric antistatic agent suitable for use in a polyester fiber, the antistatic agent is a polyester containing azelaic acid units and 2,2-dimethyl-1,3-propanediol units, and capped polyether units where the cap is

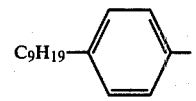

or $-C_xH_{2x+1}$ and X is 12 to 16. The antistatic agent preferably contains tetra alkyl phosphonium isophthalate units. Polyester fibers containing these antistatic agents is also disclosed.

3 Claims, No Drawings

ANTISTATIC COMPOSITION AND POLYESTER FIBER CONTAINING SAME

BACKGROUND

This invention relates to a composition that is useful as an antistatic agent for polyester fibers, and to polyester fibers containing the composition.

It is known in the art to produce synthetic fibers containing antistatic agents. The agents reduce the electrostatic propensity of the fibers. Antistatic agents have been previously added to terephthalate polyester textile fibers; for example, in Example 8 of Alderson, U.S. Pat. No. 3,900,676, N-alkyl polycarbonamide is added to a molten terephthalate polyester just prior to spinning the polyester. The N-alkyl polycarbonamide forms elongated striations in the polyester filament, and the filament has antistatic properties.

The use of antistatic agents as a core for synthetic filaments is also known in the art; see, for example, Samuelson et al, U.S. Pat. No. 4,145,473, wherein the antistatic agent is N-alkyl polyamide, polyether-ester or an ionically modified polymer such as one containing a phosphonium salt as part of the polymer chain.

Other antistatic agents have also been employed in fibers. These agents are added to the molten polymer prior to spinning and form striations in the fiber. See, for example, Magat et al, U.S. Pat. No. 3,475,898 where a poly(alkylene ether) is added to a molten polyamide, and the mixture spun into fibers.

SUMMARY OF THE INVENTION

The present invention is a polymer composition comprising at least about 75 mol percent polyester units having the formula

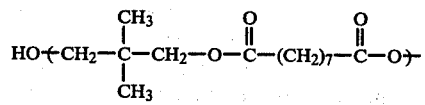

and between 5 and 25 mol percent capped polyether units having the formula $+CH_2-CH_2-O)_n R$ where n is 8 to 20 and R is

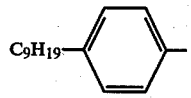

or $-C_xH_{2x+1}$ where x is 12 to 16. This polymer has a viscosity in the range 75 to 750 centipoise at 125° C., and an inherent viscosity in the range of 0.15 to 0.35. This polymer is useful as an antistatic agent in polyester fibers when incorporated into the fibers to form striations having a length to diameter ratio of at least 20 to 1, preferably at least 300 to 1, and an average diameter of about 0.5 to 1.5 microns. The antistatic polymer should be present in the polyester fiber in the amount of between about 1 and 6% by weight of the polyester fiber. The polymer composition of the invention may also contain 0.2 to 2 mol percent of a copolymerizable moiety containing tetra alkyl or tetra aryl (or a combination thereof) phosphonium sulfonate, such as described in Samuelson et al, U.S. Pat. No. 4,145,473, column 4, lines 60–68. Particularly suitable are the tetra alkyl phosphonium sulfo isophthalate units having the formula:

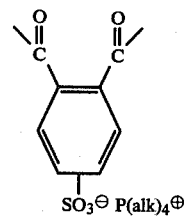

where (alk) is an alkyl of 1 to 8 carbon atoms. Preferred units are those where the alkyl groups are n-butyl.

The present invention is also a terephthalate polyester fiber containing the above described polymer in the amounts above described.

DETAILED DESCRIPTION OF THE INVENTION

The terephthalate polyester fiber of the invention is an improvement over those of the prior art in that it is cheaper to make than the sheath core filaments, and yet has a conductivity that is permanent and high enough to dissipate static charges quickly. The antistatic polymer is substantially nonreactive with the terephthalate polyester under fabrication and processing conditions, and thus the fiber is not substantially different in other chemical or physical properties from one not containing an antistatic agent, for example, the fiber has a low tendency to fibrillate. The terephthalate polyester fiber contains less polyether moiety than is usually employed in the prior art, and accordingly the terephthalate polyester fiber containing the antistatic polymer is less susceptible to oxidation during processing and use.

The polymeric antistatic agents of this invention have a resistivity, measured in ohm-cm. and reported as the logarithm to the base 10, Bulk Log Resistivities (BLR) of less than about 9.5 and preferably less than about 8.5. There is little added advantage to using as the polymeric antistatic agent a material having a resistivity of less than about 8.

The antistatic polyester fibers of this invention may be prepared by mixing the antistatic polymer with the polyester and preferably immediately spinning into fibers. The two polymers may be combined as polymer flake, but preferably are mixed in the molten state. Prior to spinning the antistatic polymer is present in the polyester as droplets. When the mixture is spun the droplets are greatly elongated, and thus form the striations in the filaments. The droplets should be approximately uniformly dispersed in the polyester polymer. The particle size of the droplets should be in the range of about 1 to 20 microns. The technique for dispersing an antistatic polymer in a fiber forming polymer is known in the art and taught by Alderson U.S. Pat. No. 3,900,676.

TESTS AND MEASUREMENTS

1. BLR

The Bulk Log Resistivity (BLR) for the polymeric antistatic agent is determined in a conventional manner on a dry composition. The composition is dried at 100° C. in an oven at a pressure less than 50 torr for at least 12 hours. The cell used for the measurements consists of a "Pyrex" glass tube of 2±0.25 mm. inside diameter and 8 mm. outside diameter and is filled with antistat by sucking up from a molten pool of polymer. Copper electrodes are inserted through rubber end-caps at each end of the tube with 33 cm. electrode separation and the current transmitted through the sample at a potential difference of 300 volts DC is recorded using a Keithley Model 410A Picoammeter. Specific resistance ($R_s$) is calculated from the equation $$R_s(\text{ohms}) = K_c/I \text{ (amps)}$$

The cell constant $K_c$ is determined by using a liquid of known specific resistance. The values reported herein used $7.63 \times 10^{-2}$ as the cell constant. The $R_s$ value is reported as its $\log_{10}$ value, i.e., BLR. Lower BLR values mean higher conductivity.

2. Static Propensity of Antistatic Filaments

The static propensity of filaments is determined by measuring the amount of direct current that passes through the filling of the fabric at a temperature of 22° C. and 26% relative humidity (see Magat et al. U.S. Pat. No. 3,475,898). The ohms per square unit of area of fabric surface is determined according to the AATCC Method, 76-59 ("Technical Manual of the AATCC", Volume 41, 1965, pages B-188). This value, given as log R, is the logarithm to the base 10 of the fabric resistance. Higher values indicate a greater tendency to acquire and retain an electrostatic charge. This method provides an approximate measure of static propensity. However, to compare filaments one should determine the log $\rho$ of the filaments, which takes into account differences in total yarn cross-section. Log $\rho$ is obtained from the expression: log $\rho$ (filaments) = log R (fabric) − log ($9 \times 10^5$D) + log (Pd) where D is the density of the polymer, P is the number of picks (filling yarn ends) per centimeter in the fabric and d is the total denier of each pick. In the examples, the value of D is 1.4 for polyethylene terephthalate.

Filaments having a log $\rho$ value not greater than 11 are considered to have acceptable antistatic properties. It will be understood that filament denier affects the log $\rho$, and should be so selected to yield filaments with log $\rho$ less than or equal to 11 and preferably less than 9.5.

Static propensity of the filaments also can be determined by a measurement of decling time in a procedure referred to as the Sail Test. The Sail Test used herein measures the severity and duration of garment cling due to static under simulated use conditions. In this test, static is induced in a garment, which may be, for example, a slip, a skirt or a dress, worn over cotton briefs by a technician, by rubbing against a fabric held between two vertical poles. Poly(hexamethylene adipamide) fabric is used with a polyester garment. The time taken for the garments to uncling (or decling) while being worn during walking around the room is determined. The room is maintained at 21° C. and 20% relative humidity. The decling time is the time in minutes required for the garment to be judged comfortable with no detectable cling from static charges. The results commonly are reported after a number of "C" washes. The garments containing the antistatic filaments have decling times less than 10 minutes.

Fabrics which are given a number of "home" wash-dry cycles in a tumble washing machine with a synthetic detergent in water at 38° C., spun-dried and tumble-dried at 77° C., are referred to as being "C" washed.

3. Viscosity, $\eta$

Viscosity was measured in glass capillary viscometers calibrated with certified standard oils at 25° C. Temperature error was minimized by heating to, and charging apparatus at, the test temperature as quickly as possible. Densities of antistats were measured in Gay-Lussac pycnometers calibrated near room temperature. Since glass expansion (cubic) ranges 2.3 to $2.8 \times 10^{-5}$ $\Delta V/V/1°$ C., calibrated volume increase of 0.23 to 0.28% max. per 100° C. should represent less than 0.5% bias on density in all cases up to 150° C. Data were taken at 72°, 125° and 150° C.

4. Inherent Viscosity $\eta_{inh}$

Inherent viscosity, $\eta_{inh}$, is determined from the expression:

$$\eta_{inh} = \text{Log}_e \eta / C$$

where $\eta$ is the viscosity of a dilute solution of the polymer in m-cresol divided by the viscosity of m-cresol in the same units and at the same temperature and C is the concentration of the dilute solution in grams of polymer per 100 ml. of solution. In the examples, the temperature used is 25° C. and the value of C used is 0.5.

5. Glass Transition Temperature, Tg

The Glass Transition Temperature Tg is measured on the Du Pont Model 1090 Differential Scanning Calorimeter, using a 15 mg. sample, and scanning from −130° C. to 20° C. at 10°/min. Tg is taken as the point at which the slope of the heating curve perceptibly becomes steeper.

EXAMPLE 1

Preparation of Polyester Antistatic Agents a. Small-Scale Laboratory Prep. in Glassware In this method, the monomer is formed via ester exchange in a one-liter, 3-neck flask, fitted with a steam-jacketed vertical column (or a Vigreux column), and a water-cooled condenser leading into a graduated collector. The polymer is formed by fitting the flask with torque-controlled stirrer, an air-cooled condenser, a collecting flask cooled in dry ice, all with provision for purging with nitrogen, evacuation to 0.10 torr, and heating the stirred polymerization vessel up to 270° C.

Polyester Antistatic Agent Shown in Table I below as A

A polyether-capped, ionically-modified antistatic agent was prepared in glassware, described above. To the flask, set up for ester exchange, was added 242 g. (1.12 moles) dimethyl azelate, 310 g. (3.0 moles) 2,2-dimethyl-1,3-propanediol, 87 g. (0.155 mole, 10 mole %) of a monohydroxypolyether having the formula R−(OCH$_2$CH$_2$)$_{\overline{n}}$OH where n is on the average 15 and R is a mixture of aliphatic hydrocarbon radicals having the formula −C$_x$H$_{2x+1}$ where x is 12 to 16 and on the average R is C$_{14}$H$_{29}$, 6.0 g. (0.0055 mole, 0.5 mole %) Tetra-n-butylphosphonium-3,5-dicarbomethoxybenzene sulfonate (TBPSI), 500 mg of the antioxidant 6H-Dibenz[c,e][1,2]oxaphosphonium-6-oxide, and 0.1 g. tetraisopropyl titanate (Tyzor ® TPT) ester exchange catalyst. The exchange reaction mixture was heated slowly from 180° C. to 230° C., and methanol was evolved as the temperature increased. The vapors were passed up the steam heated column and condensed, yielding 88 g. methanol, indicating nearly complete exchange. The reaction flask was then set up for polymerization. The same amounts of catalyst and antioxidant were added as for the exchange reaction, and the system purged with N₂. Heating and stirring at 100 rpm was started at 230° C., and the temperature very slowly increased to 260° C. When evolution of 2,2-dimethyl-1,3-propanediol ceased, the vacuum was increased to 0.10 torr over 15-30 min., and held at 270° C. for 1.5 hrs. The resulting viscous product is described in Table I.

Other polyester antistatic agents were prepared, in variations of polyester antistatic agent, using essentially the procedure described for antistatic agent A. The makeup for these as well as some key properties are also recorded in Table I.

b. Larger-Scale Preparations in Autoclave

Up to 35 lbs (15.9 Kg) polyester antistatic agent was prepared by this method. The ester-exchange reaction is carried out in a stainless steel vessel equipped with a fractionation column. The exchange is carried out at 180°-230° C., with the column base at 100°-150° C., until no more methanol is collected. The reaction batch is then transferred by pumping into a stainless steel, agitated autoclave (agitator at 30 rpm) at 230° C. The autoclave is evacuated to 2 torr over 45 minutes, and polyesterification off glycol is removed and temperature raised slowly to 265° C. The liquid polymer is finished at 265° C./2 torr with 30 rpm stirring for 1.25 hrs., then extruded with 55 psig applied helium pressure into pails under N₂.

EXAMPLE 2

Preparation of the Polyester Antistatic Agent Shown in Table II below as K 13,900 g. 2,2-dimethyl-1,3-propanediol, 12,752 g. dimethyl azelate, 4,542 g. (10 mole %) the mixture of $C_{12}$ to $C_{16}$ aliphatic-capped polyether alcohols of Example 1, 158 g. (0.5 mole %) tera-n-butylphosphonium-3,5-dicarbomethoxybenzene sulfonate, 15 g. of the antioxidant 6H-Dibenz[c,e][1,2]oxaphosphorin-6-oxide and 5 mls. tetraisopropyl titanate (Tyzor ® TPT) catalyst are combined in the ester exchange vessel and the reaction carried out until no further evolution of methanol is observed (theory = 3500 g). Transfer to the autoclave followed by polyesterification is carried out as described, above. The resulting polyester antistat agent is described in Table II. Other combinations, as described in Table II, were reacted in essentially the same procedures and quantities, with the resulting described polyester antistatic agents. Item J is not an antistatic agent of this invention.

EXAMPLE 3

Preparation of Antistatic Yarn

Polyester yarn was spun from a flake-fed screw-melter, fitted near the feed end with an injection needle through which a metered stream of antistatic polymer can be injected into the fiber-forming polymer melt. The antistatic polymer was fed from a heated (100° C.), pressurized hopper, and its pressure increased with a pump so as to balance with the pressure of the molten fiber-forming polymer in the screw-melter. Samples of antistatic polymer were taken from a sampling port to determine the rate of antistatic pumping delivered at a given pump setting. Poly(ethylene terephthalate) flake having a relative viscosity (RV) of 23.1 (Note: RV was measured by the relative viscosity method described by Samuelson, et al., in U.S. Pat. No. 4,145,473, col. 7, line 66 to col. 8, line 5.) was fed to the screw melter, without the injection of antistatic polymer, to provide an unmodified control. The yarn is drawn 2.0×. A 40 denier (0.444 tex), 27 filament, trilobal cross-section yarn was collected. The yarn relative viscosity was 20.7.

After collection of 5.5 Kg of control yarn, the antistat injection system was turned on and 5.2% by weight Antistatic Polymer K injected into the polymer melt stream. Thorough mixing was achieved by the counter revolving double screw design, but no additional in-line mixers were employed. The 27 filament yarn was drawn 2.0× to 40 denier. The yarn relative viscosity was 18.0, which is about what is expected in view of the dilution of the poly(ethylene terephthalate) with the antistatic polymer.

The unmodified control, above, had a fiber log $\rho=12.20$, whereas the antistat-modified fiber had log $\rho=10.56$. Corresponding fabric log R's are 14.80 and 13.16, respectively.

Half slips, made up from warp knit tricot fabrics of the above yarns after 5 "C" washings were Sail-Tested against a nylon sail. Sail-Test decling times were >10 min. for the unmodified control and 7.6 min. for the antistat-modified test item.

Abrasion tests on dyed fabrics from the test and control yarns showed them to be equivalent, indicating no additional fibrillation propensity because of the second-phase polyester antistat.

TABLE I

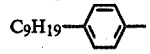

| Antistatic Polymer | End Cap | Mole % Cap | Mole % TBPSI | BLR | Tg | ηinh | Description |
|---|---|---|---|---|---|---|---|
| A | See Example 1 | 10 | 0.5 | 8.2 | −60° C. | 0.23 | Viscous Liq. |
| B | R(OCH₂CH₂)ₙ—OH where n is on the average 15 and R is C₉H₁₉—⌬— | 10 | 0.5 | 8.45 | −59° C. | 0.20 | Viscous Liq. |
| C | Same as A | 10 | 0 | 8.5 | −57° C. | 0.22 | Viscous Liq. |
| D | Same as B | 10 | 0 | 8.9 | −58° C. | 0.24 | Viscous Liq. |
| E | Same as A | 20 | 0 | 8.2 | — | — | Viscous Liq. |
| F | Same as B | 20 | 0 | 8.7 | — | — | Viscous Liq. |
| G | Same as A | 10 | 1.0 | 7.6 | — | — | Viscous Liq. |
| H | Same as B | 10 | 1.0 | 7.65 | — | — | Viscous Liq. |
| I | Same as B except n is on the average 10. | 20 | 0 | 8.6 | — | — | Viscous Liq. |

TABLE I-continued

| Antistatic Polymer | End Cap | Mole % Cap | Mole % TBPSI | BLR | Tg | ηinh | Description |
|---|---|---|---|---|---|---|---|
| J | Stearic Acid | 20 | 0 | 9.8 | — | — | Viscous Liq. |

TABLE II

Autoclave Preparation of Antistatic Polymers

| Polyester Antistat | Cap | Mole % Cap | Mole % TBPSI | BLR | η Cp at 125° C. | ηinh | Tg | Description |
|---|---|---|---|---|---|---|---|---|
| K | Same as A | 10 | 0.5 | 8.1 | 175 | 0.23 | −55° C. | Viscous Liq. |
| L | Same as A | 10 | 0 | 8.8 | 250 | — | — | Viscous Liq. |
| M | Same as A except n is on the average 10 | 10 | 0.5 | 8.5 | — | 0.28 | −61° C. | Viscous Liq. |
| N | None | 0 | 0 | 9.7 | — | 0.86 | — | Unacceptably viscous liq. |

I claim:

1. A static resistant terephthalate polyester fiber, containing between 1 and 6% by weight of a polymer composition comprising at least about 75 mol percent polyester units having the formula

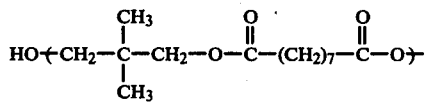

and between 5 and 25 mol percent capped polyether units having the formula $+CH_2-CH_2-O)_n-R$ wherein n is 8 to 20 and R is

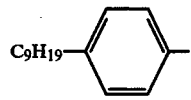

or $-C_xH_{2x+1}$ where x is 12 to 16, said polymer composition having an inherent viscosity in the range of 0.15 to 0.35 and said polymer composition existing in the fiber as striations, said striations having a length to diameter ratio of at least about 20 to 1 and an average diameter in the range of about 0.5 to 1.5 microns.

2. The polyester fiber of claim 1 in which the polymer composition existing as striations contains 0.2 to 2 mol percent tetra alkyl phosphonium sulfo isophthalate units.

3. The polyester fiber of claim 2 in which the striations have an average length to diameter ratio of at least about 300 to 1.

* * * * *